United States Patent
Sherrard et al.

(10) Patent No.: US 6,608,634 B1
(45) Date of Patent: Aug. 19, 2003

(54) SYSTEM AND METHOD FOR DEMONSTRATION OF DYNAMIC WEB SITES WITH INTEGRATED DATABASE WITHOUT CONNECTING TO A NETWORK

(75) Inventors: Jeffrey D. Sherrard, Lakewood, CO (US); Daniel Pride, Polson, MT (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/471,836

(22) Filed: Dec. 23, 1999

(Under 37 CFR 1.47)

(51) Int. Cl.[7] .................................................. G09G 5/00
(52) U.S. Cl. ....................... 345/730; 345/705; 345/760; 345/962; 707/513
(58) Field of Search ................................ 345/700, 705, 345/714, 730, 733, 744–748, 760, 866, 962, 968; 705/1, 26; 707/10, 3, 501, 513

(56) References Cited

U.S. PATENT DOCUMENTS

| | | | |
|---|---|---|---|
| 5,850,433 A | * 12/1998 | Rondeau | 379/216.01 |
| 5,920,864 A | * 7/1999 | Zhao | 707/10 |
| 6,055,514 A | * 4/2000 | Wren | 705/26 |
| 6,338,068 B1 | * 1/2002 | Moore et al. | 707/102 |
| 6,438,539 B1 | * 8/2002 | Korolev et al. | 707/10 |

* cited by examiner

Primary Examiner—Sy D. Luu
(74) Attorney, Agent, or Firm—Marsh Fischmann & Breyfogle LLP

(57) ABSTRACT

A system for displaying operations of a dynamic web site with integrated database without connecting to a network is disclosed. An off-line presentation of a selected web site is developed by extracting selected portions of hypertext markup language ("HTML") documents and databases associated with the selected web site from the server to a client computer. The present invention automates the process of extracting HTML documents from the selected web site by using a script of commands. Based on the commands in the script, the client computer running a script engine is configured to transmit a request for transfer of the selected HTML documents and separately saved files which are related to the selected HTML documents including text, forms, images, sounds, videos, and other sections of the HTML documents. The off-line presentation is stored in the hard drive of a stand-alone system and is executed by using a web browser to allow a user to interact with the selected web site. In one embodiment, the off-line presentation is generated for an Internet Yellow Pages ("IYP") web site providing on-line directory services. In this regard, the off-line presentation of the IYP web site allows sales representatives to market a wide range of services and products that are available over the IYP web site without the necessity of connecting to a network.

15 Claims, 4 Drawing Sheets

| SEARCH BY CATEGORY | SEARCH BY BUSINESS NAME | SHOPPERS GUIDE | FIND PEOPLE | IN YOUR AREA |

SEARCH THE YELLOW PAGES

POPULAR CATEGORIES: <u>ACCOUNTANTS</u>
                -OR-
ENTER A CATEGORY: _____ /(THREE OR MORE LETTERS)

CITY: <u>DENVER</u>           ⬜ <u>SURROUNDING AREA</u>

STATE: <u>COLORADO</u>   ⬜

SUBMIT  -  MORE  -  SEARCH  -  OPTIONS
    [X]      [X]

FIG. 4

| SEARCH BY CATEGORY | SEARCH BY BUSINESS NAME | SHOPPERS GUIDE | FIND PEOPLE | IN YOUR AREA |

SEARCH THE BUSINESS WHITE PAGES

BUSINESS NAME: _____ / (TWO OR MORE LETTERS)
           -OR-
BRAND* NAME: _____ /(TWO OR MORE LETTERS)

CITY: <u>DENVER</u>           ⬜ <u>SURROUNDING AREA</u>

STATE: <u>COLORADO</u>   ⬜

SUBMIT  -  MORE  -  SEARCH  -  OPTIONS
    [X]      [X]

*BRAND NAME SEARCH AVAILABLE IN AZ, CO, ID, IA, MN, MT, NE, NM, ND, OR, SD, UT, WA, WY

FIG. 5

SYSTEM AND METHOD FOR DEMONSTRATION OF DYNAMIC WEB SITES WITH INTEGRATED DATABASE WITHOUT CONNECTING TO A NETWORK

FIELD OF THE INVENTION

The present invention generally relates to methods and systems for demonstrating web sites, and, in particular, to a system and method for demonstrating dynamic web sites with integrated databases without a network connection.

BACKGROUND OF THE INVENTION

The Internet has become an increasingly popular form of providing and obtaining information. The number of web sites linked to the World Wide Web is growing at an exponential rate. Some of the web sites on the Internet are dedicated to providing useful information to Internet users and derive a portion of their revenue from offering advertisement and other services through their web site. One example of web sites providing information is on-line directory services. Today, a variety of on-line directory services are available to permit users of the Internet to search for telephone numbers of a particular company or person. The utilization of these on-line directory services has become increasingly popular since they are convenient to use and are effective in locating information requested by the user.

Generally, telecommunications companies that provide on-line directory services also offer advertisement and other services through their web site. In order to market their advertising services effectively, it is desirable for their sales representatives to have the capability to demonstrate a wide range of products and services available to businesses via their web sites. Presently, sales representatives use desktop or portable computers connected to the Internet to access their web sites in order to visually illustrate how the products and services available over the web site can help attract new customers. However, in some instances, the inconvenience of connecting to the Internet or the Internet being inaccessible may prevent sales agents from demonstrating the advertisement services to potential business clients.

SUMMARY OF THE INVENTION

Thus, there is a particular need for a system that is capable of allowing a demonstration of dynamic web sites with integrated databases without the necessity of connecting to a communications network.

The present invention is directed to a method and system for allowing a user to display operations of a selected web site without connecting to a network. The present system utilizes a stand-alone computing device running a graphical user interface based web browser to allow a user to interact with hypertext documents and a database stored in a data transfer medium (e.g., disks or tapes) or a data storage device (e.g., hard drive). The hypertext documents and database, used by the stand-alone devices, may have been previously extracted from a server in connection with the selected web site via a network (e.g., the Internet). The stand-alone device may be any computing device (e.g., portable computer) employing an operating system which supports a graphical user interface based web browser.

According to one aspect of the present invention, the stand-alone device may utilize a search engine in communication with the web browser configured to search the database, in response to search instructions entered by a user, and generate a list of search results. In one embodiment, the device utilizes a web browser to receive search instructions from a user and utilizes a separate search engine adapted to search the records contained in the database according to the search instructions entered by the user. Alternatively, the device may be implemented using a web browser which has its own searching capabilities.

In accordance with another aspect of the present invention, a method of developing an off-line presentation of a selected web site is provided. The off-line presentation may be produced by extracting selected HTML documents and databases from servers associated with the selected web site. The process of extracting HTML documents from the selected web site over a network may be automated using a script. Based on the commands composed in the script, a client computer running the script engine may be configured to transmit a request for transfer of the selected HTML documents from the server computer. The script of commands may be further composed to automatically extract separately saved files that are associated with the selected HTML documents including text, forms, images, sounds, videos, and other portions.

According to a related aspect of the present invention, the directory information stored in the client computer may be populated using a database management program to download selected portions of the databases associated with the selected web site over the Internet. The downloaded directory information is stored in searchable and retrievable form. For example, the directory information may be organized in the form of database records. Alternatively, the directory information may be in a text file format. After the selected documents and data have been downloaded onto the client computer, they may be copied onto a data transfer medium (e.g., magnetic or optical disks) and loaded onto stand-alone computing devices for utilization by sales representatives to display operations of the selected web site off-line.

According to a further aspect of the invention, an off-line presentation of a selected web site is provided to allow demonstration of products and services offered over the web site without having to connect to a network. The off-line presentation may comprise a set of hypertext documents and data which collectively enable demonstration of selected features and operations of a web site. The off-line presentation may be loaded onto a computing device or copied onto a data transfer medium (e.g., magnetic or optical disks) to enable demonstration of the web site at virtually any location even when connection to a network is unavailable. Additionally, because the demonstration of the selected web site is conducted off-line, no network transitional time is incurred during the execution of the presentation.

In a related aspect of the invention, an off-line presentation of an on-line directory service is provided. The off-line presentation may be used by sales representatives of telecommunications companies to market tools offered through its on-line directory service web site, including web site development, local banner ads, information pages, additional listings, and a wide variety of other products and services. The off-line version of an on-line directory service may be developed by extracting a selected portion of hypertext documents and data from the corresponding live web site over the Internet. The hypertext documents and portion of the original databases are selected to enable demonstration of the key features of the web site without overburdening the computing device with too much data.

According to a further aspect of the invention, a directory listing telephone numbers and other information relating to business entities and individuals is provided in the form of a data transfer medium (e.g., magnetic or optical disks). In this regard, the present invention provides a cost effective way of producing and distributing directories to consumers and businesses. Moreover, the time necessary for searching through directory listings is reduced when compared with the traditional way of searching through the printed directory publications. In one embodiment, the directory is interactable using a graphical user interface based web browser and is configured in the same format as the on-line directory service so that it can be readily used by users who are already familiar with the web format. In one embodiment, the directory in the form of an optical disk (e.g., CD ROM) may be developed by extracting information directly from servers (e.g., web servers and database servers) on the Internet which contain current directory listing information related to individuals and business entities and other information such as commercial advertisements.

BRIEF DESCRIPTION OF THE DRAWINGS

FIG. 4 is a display screen produced by a graphical user interface based web browser providing an example of a home page of a web site providing on-line directory services.

FIG. 5 is a display screen providing an example of a web page corresponding to a search by business name.

DETAILED DESCRIPTION

Figure 1:
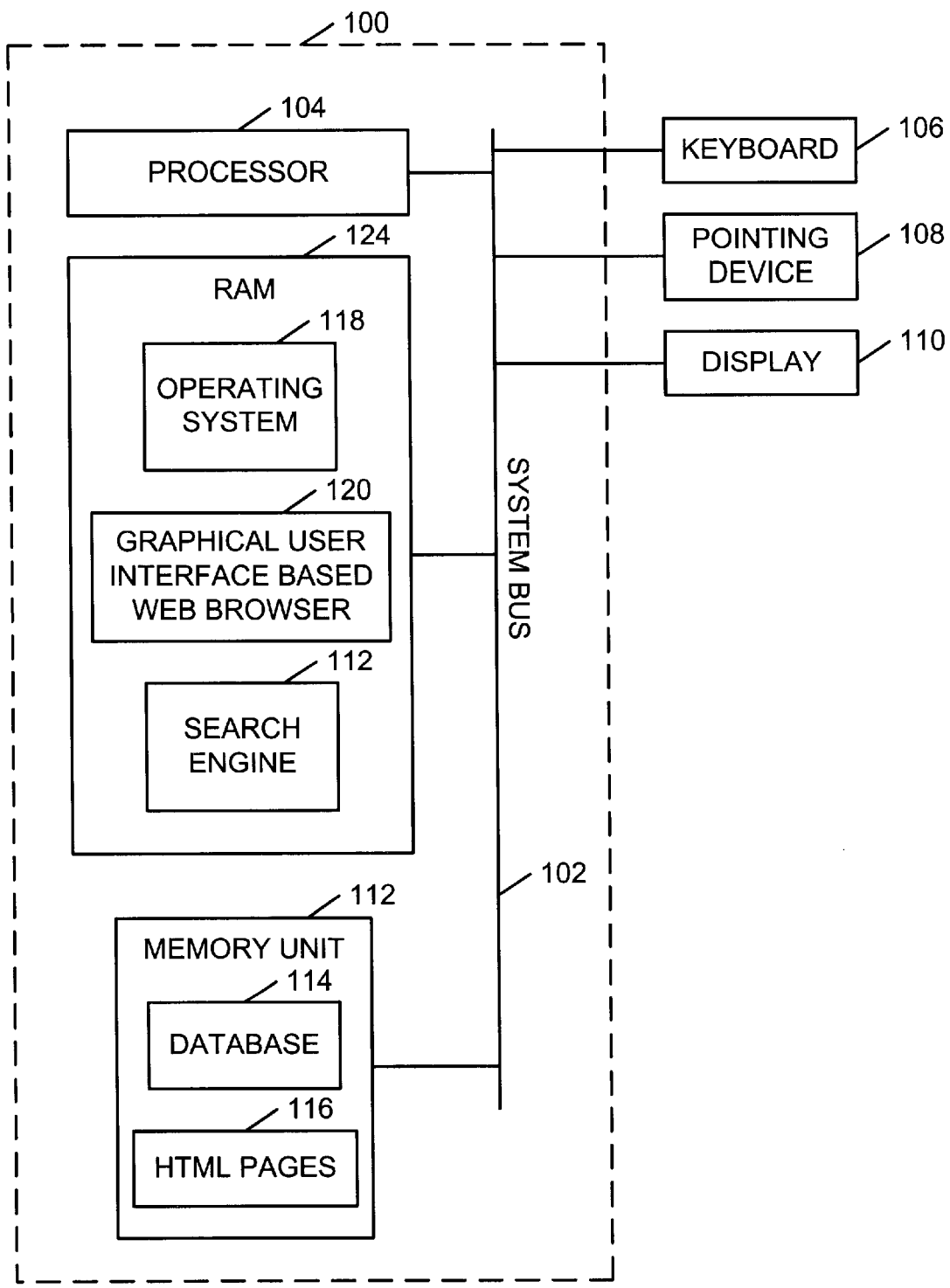
FIG. 1 is a block diagram illustrating a client computer in which the present invention may be embodied.

Referring now to FIG. 1, a block diagram of a stand-alone computing device 100 in which the present invention is implemented is shown. The stand-alone device 100 includes a system bus 102 to which various components are coupled and by which communication between the various components is accomplished. Connected to the system bus 102 is a processor 104, input devices such as a keyboard 106 and a pointing device (e.g., mouse) 108, and a display unit 110. Also connected to the system bus 102 is a memory unit 112 which stores, among other things, a database 114 and HTML documents 116. The memory unit 112 may be any suitable storage device such as a hard drive, floppy disk drive, tape unit, CD-ROM and the like. The stand-alone device 100 can be realized by any computing system employing an operating system 118 which supports a graphical user interface based web browser 120, such as a Netscape Navigator, Microsoft Internet Explorer, Lynx and the like. The present system may operate using any conventional web browsers or any other suitable graphical user interface program that allows users to view and interact with hypertext documents.

Residing within a random access memory 124 is a search engine 122 which is employed to perform searches of the database through use of the web browser. The search engine 122 may generate a list of search results in response to search instructions entered by a user. The present invention may utilize a web browser to receive search instructions from a user and also utilize a separate search engine to search the records contained in the database based on the received search instructions. Alternatively, the present invention could be implemented using a web browser which has its own searching capabilities.

The system of the present invention may be used to demonstrate any dynamic web site with integrated databases off-line. An off-line presentation of a web site is developed for the purposes of allowing a user to display operations of a web site without a network connection. For example, the off-line presentation can be used by sales representatives at a remote location to demonstrate products and services available to businesses via their web sites. Because the off-line presentation can be loaded onto any suitable computing device and executed regardless of network availability, it will be particularly useful in situations where connecting to the Internet is either impossible or just too inconvenient.

In one embodiment, a web site providing on-line directory services is selected for the development of an off-line presentation. In this way, sales agents of telecommunications companies can conveniently demonstrate products and services offered through its live web site without having to deal with problems associated with trying to connect to the Internet at remote client locations. A variety of on-line directory services are available on the Internet which enables Internet users to search for the address and phone number of a particular person or business by entering search information. One such on-line telephone directory service is provided by U.S. West, Inc., featuring both "White Pages" and "Yellow Pages" related information at www.uswestdex.com, which is incorporated herein by reference.

Figure 2:
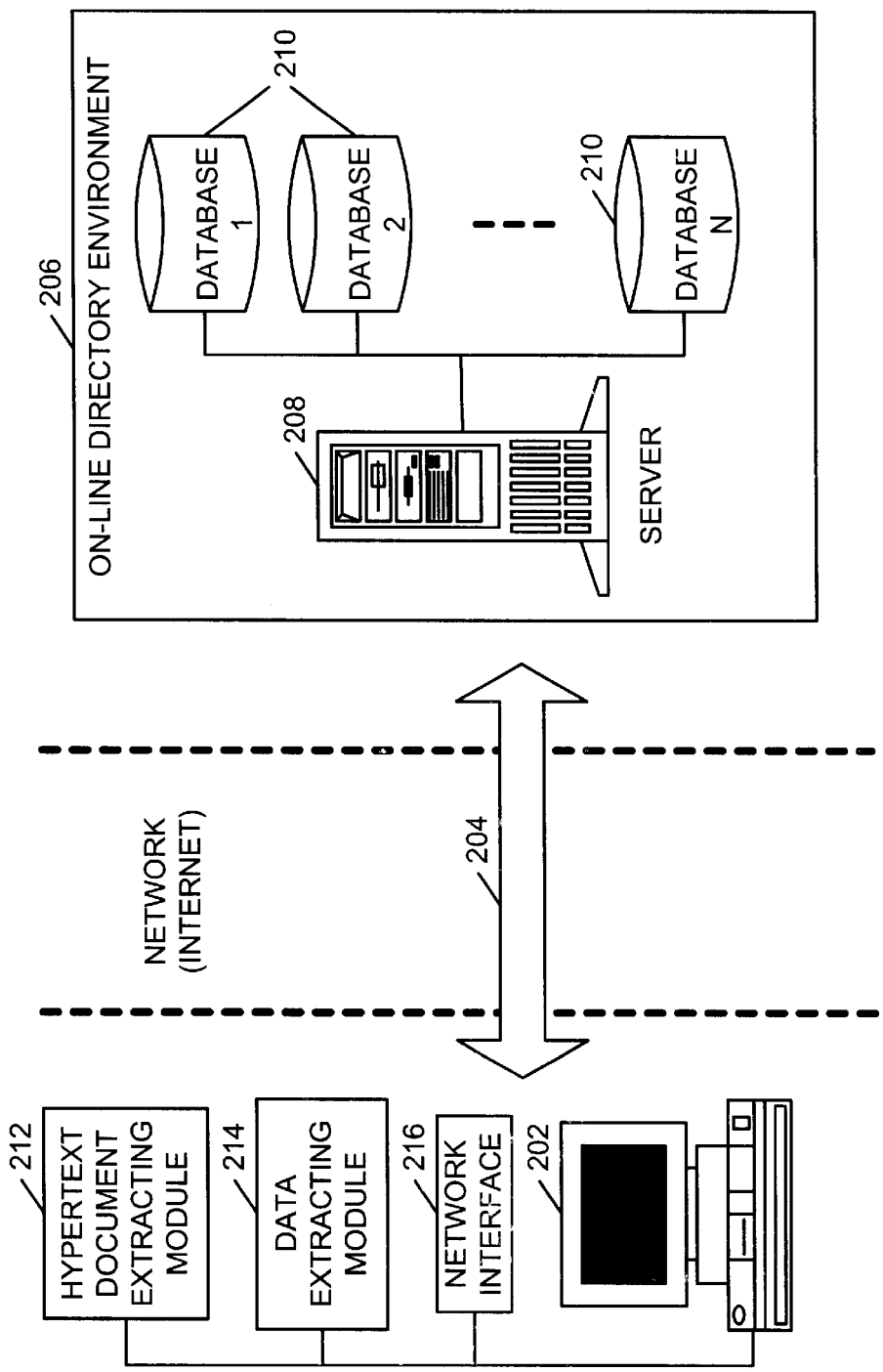
FIG. 2 is a block diagram illustrating a server computer and a client computer communicating over a network, such as the Internet.

Referring now to FIG. 2, a client computer 202, used for developing an off-line presentation of a selected web site, is shown. The development of the off-line presentation is accomplished by using the client computer to download information (e.g., hypertext documents and data) directly from one or more servers in connection with the selected web site 204. For the purposes of downloading information over a network, the client computer 202 is equipped with a network interface 216 which is capable of sending and receiving data to and from the server in connection with the selected web site. Connected to the network interface 216 is a data extracting module 214 which is configured to extract selected portions of the databases in connection with the selected web site. The data extracting module 214 may be embodied in the form of a database management program, such as a Sybase database management program. Typically, the database management program includes download features, such as "bulk copy," to transfer information from the database server to a client computer.

The selected live web site may be incorporated, for example, in an on-line directory environment 206 which includes at least one server 208 linked with one or more databases 210. The databases 210 incorporated in the on-line directory environment 206 may be maintained and updated by the telecommunications companies using commercially available database management software. Each database stores a number of data "records," with each data record containing various "fields" of information. As an example, a database for business directories or listings may include a record for each business entity, each record containing fields designating specifics about a business entity, such as name, address, phone number, and other pertinent information useful to Internet users searching an on-line telephone directory.

Generally, the databases maintained by an on-line directory service contain a relatively large amount of information since they may include directory information to cover a vast geographical area. In addition, the information contained in one database may be also included in a different database configured to minimize search time for different types of searches, e.g., the business directory may be divided into a number of different databases based on the category of services provided. To reduce the data size of the off-line presentation, it may be desirable to download directory information with regard to a specific geographical area, e.g., equivalent of a local directory listing. Upon transfer of the database records from the server to the client computer, the downloaded information may be stored in a local database in searchable and retrievable form (e.g., text file format or database record format). Also, to further reduce the data size, only one local database may be used with the off-line presentation organized and structured to accommodate all types of searches rather than having a separate database for each specific type of searches.

In addition to downloading data from the database servers, the client computer is also configured to extract hypertext documents which are each identified by a unique universal resource locator ("URL") from one or more servers in connection with the selected web site. Manually extracting hypertext markup language ("HTML") documents from a live web site having a number of dynamic web pages and transmitting them over a network to a client computer can be a lengthy and difficult process involving the need for finding all the separately saved files associated with each document, such as images, audio, video and other files that are typically referenced by HTML documents. When an HTML document is viewed, any image, audio or video files associated with such HTML document are displayed as part of the document. Consequently, the manual process of extracting HTML documents from the Internet requires not only the steps of capturing the shell of each HTML document individually but also requires finding and saving image, audio and video files that are referenced by each document.

For this reason, a hypertext document extracting module 212, in communication with the network interface 216, is provided in the client computer 202. The hypertext document extracting module 212 is configured to automate the process of retrieving hypertext documents directly from a web server. The hypertext document extracting module 212 may be embodied in the form of a script of commands executed by a script engine running on the client computer. A script is a text file that includes a series of commands which are executed by a script engine to effect instructions defined by the script. Based on the commands composed in the script, the client computer running the script engine is configured to transmit a request for transfer of the HTML documents corresponding to selected hypertext links from the server computer at the web site to the client computer. The client computer stores the HTML documents in a data storage device, e.g., hard drive, in retrievable form for later use. It may be desirable to store the HTML documents in subdirectories corresponding to the URL identifiers associated with the original HTML documents residing in the server. In this regard, during the execution of the off-line presentation of the web site, the web browser is able to retrieve HTML documents by specifying the directory paths in which the documents are located and filenames of the documents.

The development of an off-line presentation may be accomplished with the use of the client computer. By entering a URL identifier for the selected web site, a communications link between a corresponding server computer and the client computer is established. Then, a series of commands prescribed in the script are executed by the script engine running on the client computer to automate the process of extracting a set of selected HTML documents from the server to the client computer. As noted above, the HTML documents typically include links to other web pages or web sites, sounds, video, animations, and other components. With regard to each HTML document, it will be appreciated by those skilled in the art that the script may be composed to automatically extract virtually any portion of the HTML document, including text, forms, images, sounds, videos, Visual Basic script, Java script components and other portions of the HTML documents. Furthermore, it will be appreciated by those skilled in the art that the script may be composed to automatically move from one HTML document to another, until the entire set of selected HTML documents have been downloaded. Later, the HTML documents and databases saved on the client computer may be copied onto a data transfer medium (e.g., magnetic or optical disks) and loaded onto the stand-alone devices (e.g., portable computers) which will be utilized by the sales representatives to demonstrate the features of the web site without having to connect to a network.

In accordance with the present invention, the set of hypertext documents along with the selected portion of data downloaded from the Internet collectively enable a user of the stand-alone computing device to demonstrate features of any suitable dynamic web site with integrated databases off-line. For example, an off-line presentation may be developed for the purposes of demonstrating features of a web site providing on-line directory services (e.g., an Internet Yellow Pages ("IYP") web site). Typically, an on-line directory service consists of a number of dynamic HTML documents and relatively large databases containing "white page" listings as well as "yellow page" listings.

Figure 3:
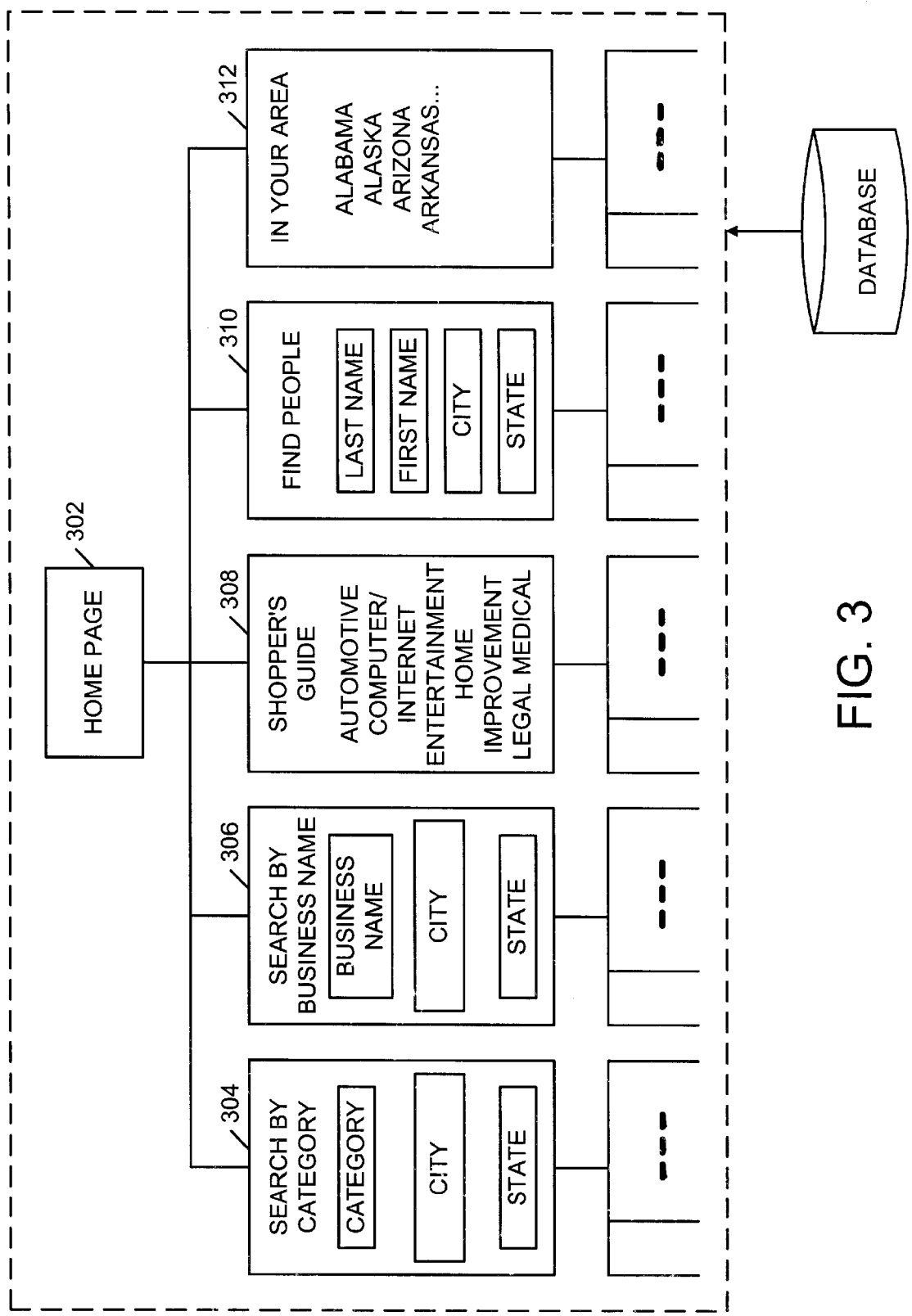
FIG. 3 is a block diagram illustrating an organization of HTML pages and the database in accordance with the present invention.

Referring now to FIG. 3, an example illustrating an overall architecture of an on-line directory service is schematically depicted as resembling a tree, in which all of the HTML documents branch off from a home page. As noted above, the on-line directory service may be divided into different types of searches to minimize search time associated with each specific type of search. For example, the on-line directory service may be divided into five types of searches; (a) Search by Category 304, (b) Search by Business Name 306, (c) Shopper's Guide 308, (d) Find People 310 and (e) In Your Area 312. One or more of these search types are selected for development of the off-line version thereof such that features of the on-line directory service pertaining to businesses can be demonstrated without being too voluminous for the stand-alone device.

In one embodiment, two of the five search types are chosen for inclusion in the offline version of the on-line directory service; (1) the Search by Category may be selected which allows searching for a business by first selecting a general category of business, such as accountants, airline companies, apartments, attorneys, etc., and (2) the Search by Business Name may be selected which searches through the databases and retrieves information such as phone number and address applicable to the name of a business entity entered by the user. In Search by Category, a user may conduct a search of "yellow pages" related information based upon a category of business. By selecting a business category, city and state, a list of business names that corresponds to the selected business categories, city and state, is presented to a user. Similarly, in a Search by Business Name, a user may conduct a search of "business white pages" related information based on business name or brand name entered by the user. Once a search request has been entered by the user, the database stored in the stand-alone device will be searched via a search engine to generate a list of business listings that are most relevant to the search instruction. In this way, the off-line presentation featuring less than the entire live web site (e.g., search by business category and search by business name) is capable of displaying selected operations of the web site (e.g., tools offered through the on-line directory services for attracting new clients). These tools may include web site development, local banner ads, information pages, additional listings, and a wide variety of other products and services.

The basic operations of the system are as follows. When a user needs to demonstrate operations of a particular web site but does not have access to the Internet, the off-line presentation stored in the stand-alone computing device may be accessed by using any suitable graphical user interface based browser. The off-line presentation may be initiated by entering the directory and file name of the home page associated with the off-line presentation in the location field of the browser, or by utilizing a shortcut feature for accessing the home page, such as a shortcut icon or a bookmark. By requesting the off-line presentation, the user may be automatically connected to the home page document of a selected web site located within a subdirectory of the stand-alone computing device, such as the home page of the on-line directory service as shown in FIG. 4. As seen by referring to the home page in FIG. 4, the on-line directory service may be in the format that allows the user to make search type selections. Along the top edge of the rectangular form 400 appears tabs 402–410 presenting different types of searches that can be selected by the user. Links are embedded in the tabs so that by clicking on one of the tabs (e.g., tab 404 labeled "Search by Business Name"), a corresponding hypertext document will be invoked, as shown in FIG. 5. Residing within the hypertext document related to "Search by Business Name" is a form 500 which includes a number of fields 502–508 where search instructions are entered to facilitate finding the desired business or person.

While the foregoing preferred embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A system for providing an off-line presentation of a selected web site, comprising:

a network interface which interconnects a client computer to at least one server in connection with the selected web site via a communications network;

a hypertext document extracting module, running on said client computer, which employs a user defined script to extract a set of selected hypertext documents corresponding to selected hypertext links associated with said selected web site from at least one web server in connection with said selected web site via a network connection, said set of selected hypertext documents including a home page with at least one link to at least one linked web page;

a data extracting module, running on said client computer, which is configured to extract a selected portion of data associated with the selected web site from at least one database server in connection with said selected web site;

a data storage to store said set of selected hypertext documents and said selected portion of data extracted;

a stand-alone computing device, having access to said set of selected hypertext documents and said selected portion of data extracted, which is configured to retrieve and display said home page, to retrieve and display said at least one linked web page in response to activation of said at least one link to receive a search instruction entered by a user and to retrieve information from said selected portion of data in response to said search instruction and display said information retrieved; and a graphical user interface in connection with said stand-alone computing device to display and enable interaction with said set of hypertext documents and said data stored in said data storage.

2. The system of claim 1, wherein said set of selected hypertext documents and said selected portion of data collectively enable the user of the stand-alone computing device to demonstrate features of the selected web site without a network connection.

3. The system of claim 1, wherein said data stored in said data storage is organized in the form of database records.

4. The system of claim 3 further comprising a search engine in communication with said graphical user interface configured to search said database records, in response to a search request entered by the user, and generate a search result list.

5. The system of claim 1, wherein said data stored in said data storage is in a text file format.

6. The system of claim 1, wherein said graphical user interface comprises a web browser running on said stand-alone computing device.

7. The system of claim 1, wherein said selected web site provides an on-line directory service.

8. The system of claim 7, wherein the off-line presentation of the web site providing on-line directory service is used to market products and services offered through the on-line director service web site.

9. A method for developing a stand-alone presentation of a selected web site using a client computer having a memory and access to a communications network, wherein said stand-alone presentation of said selected web site is demonstrable without connecting to said communications network, said method comprising the steps of:

interconnecting said client computer to at least one server in connection with a selected web site via the communications network, said selected web site having a set of hypertext documents and at least one database;

extracting a portion of said set of hypertext documents corresponding to selected hypertext links associated with said selected web site from said at least one server employing a user defined script and storing said portion of said set of hypertext documents extracted in the memory of the client computer;

extracting data from said at least one database in connection with said server and storing said data extracted from said selected web site in the memory of the client computer;

disconnecting said client computer from said at least one server; and accessing the memory and presenting said portion of said set of hypertext documents and said data extracted from said selected web site.

10. The method of claim 9, wherein said step of accessing the memory and presenting said portion of said set of hypertext documents and said data extracted is accomplished by using a web browser running on a computing device.

11. The method of claim 9, wherein said portion of said set of hypertext documents comprises a home page with at least one link to at least one web page.

12. The method of claim 11, wherein said step of accessing the memory and presenting said portion of said set of hypertext documents and said data extracted comprises the steps of:

retrieving said home page associated with said selected web site from said memory and displaying said home page retrieved;

retrieving said at least one web page from said memory and displaying said at least one web page in response to activation of said at least one link;

receiving a search request entered by a user;

searching said at least one database, in response to said search request, to generate a search result list; and displaying said search result list generated.

13. The method of claim 9, wherein said data stored in the memory is in the form of database records.

14. The method of claim 9, wherein said data stored in the memory is in the form of ASCII data files.

15. The method of claim 9, wherein said selected web site is an Internet Yellow Pages web site providing on-line directory services.

\* \* \* \* \*